United States Patent [19]

Halasa et al.

[11] 3,948,869

[45] Apr. 6, 1976

[54] PROCESS FOR POLYMERIZING CONJUGATED DIENES

[75] Inventors: Adel Farhan Halasa, Bath; Richard Gutierrez, Akron, both of Ohio

[73] Assignee: The Firestone Tire & Rubber Company, Akron, Ohio

[22] Filed: Apr. 8, 1974

[21] Appl. No.: 458,951

[52] U.S. Cl. ........ 260/85.3 R; 252/429 B; 260/94.3; 260/94.4; 260/94.9 CC
[51] Int. Cl.² . C08F 4/52; C08F 36/04; C08F 36/06
[58] Field of Search ...... 260/85.3 R, 94.4, 94.9 CC, 260/94.3

[56] References Cited
UNITED STATES PATENTS

| | | | |
|---|---|---|---|
| 3,317,494 | 5/1967 | Farson | 260/94.4 |
| 3,470,144 | 9/1969 | Minekawa et al. | 260/85.3 R |
| 3,590,024 | 6/1971 | Ishizuka et al. | 260/85.3 R |
| 3,766,153 | 10/1973 | Kawasaki et al. | 260/85.3 R |
| 3,803,106 | 4/1974 | Hayashi et al. | 260/85.3 R |

*Primary Examiner*—Alan Holler

[57] ABSTRACT

Conjugated dienes and alpha-olefins, such as butadiene and propylene, are copolymerized by a new catalyst system which gives copolymers containing a high proportion of the alpha-olefin with accompanying desired properties. This catalyst system comprises: (1) A titanium or vanadium halide, preferably chloride, (2) an aluminum hydrocarbon compound, preferably an aluminum trialkyl having 1–8 carbon atoms in each of said alkyl groups and (3) $CS_2$. The copolymers produced by this process have molecular weights in the range of 100,000–5,000,000, preferably 250,000–500,000, and other desirable properties.

19 Claims, No Drawings

PROCESS FOR POLYMERIZING CONJUGATED DIENES

BACKGROUND OF THE INVENTION

1. Field of the Invention

This invention relates to a process for the copolymerization of a diene, such as butadiene, with an alpha-olefin, such as propylene using a catalyst comprising a titanium or vanadium halide, an aluminum trialkyl and carbon disulfide to give copolymers having a substantial proportion of propylene or other alpha-olefin therein.

2. Related Prior Art

The copolymerization of propylene with conjugated dienes has been reported in several instances. However, the methods reported for effecting such copolymerization have various disadvantages.

For example, British Pat. No. 1,108,630 shows the use of a catalyst system comprising $TiCl_4$, aluminumtrialkyl and iodine.

French Pat. No. 2,047,646 shows the use of a catalyst system comprising $TiX_4$ wherein X is Cl, Br or I, $AlR_3$ wherein R is alkyl, aryl or cycloalkyl, and a compound containing a carbonyl group. Preferred carbonyl compounds as illustrated in the examples are benzophenone, diisobutyl aldehyde, benzoyl chloride, isobutyric acid, benzoic acid, monochloroacetic acid, maleic anhydride, diethyl malonate, diethyl acetate, acetone, benzaldehyde, acetic anhydride, etc. Temperatures of $-30°C$. to $-40°C$. are apparently preferred since all of the 34 working examples are conducted at these temperatures with the exception of one at $-15°C$. and one at $-55°C$.

The low temperature polymerization in these prior art systems are impractical for industrial purposes because of the added expense and slow polymerization rates.

SUMMARY OF THE INVENTION

In accordance with the present invention, it has now been found that more practical temperatures may be used in the preparation of copolymers of a conjugated diene with an alpha-olefin with high proportions of the alpha-olefin having 2–8 carbon atoms, therein to give desirable properties and with desired molecular weights, conversions and microstructure by the use of a catalyst system comprising (1) a halide having the formula $TiBr_nCl_{4-n}$ or $VBr_mCl_{5-m}$ wherein $n$ is an integer having a value of 0–4 and $m$ is an integer having a value of 0–5; (2) an aluminum hydrocarbon having the formula $AlR_3$ wherein R is aryl, cycloalkyl or preferably alkyl with R having 1–8 carbon atoms; and (3) carbon disulfide. In this catalyst system the ratio of Al to Ti or V is advantageously 0.9–3 moles, preferably 0.9–1.15 moles, of Al compound per mole of Ti or V; the ratio of $CS_2$ to Ti or V compound is 0.01–0.5, preferably 0.01–0.1 mole of $CS_2$ per mole of Ti or V compound; and the ratio of Ti or V compound to monomer is 1–10 millimoles of Ti or V compound per 100 grams of monomer. Advantageously the copolymerization is effected in a hydrocarbon solution which contains 10–90% preferably 10–50% by weight of the monomers.

The presence of the $CS_2$ permits the addition of as much propylene or other alpha-olefin as desired, that is 5–90% by weight olefin, with 5–60% by weight based on the combined weight of olefin and diene being preferred. It also promotes high conversions and desirable molecular weights and the resultant copolymers are predominantly of the preferred cis-1,4 microstructure.

The use of $CS_2$ also has the advantage of permitting control over the stereoregularity and thereby the crystallinity of the resultant copolymer. Thus by control of the amount of $CS_2$ used, it is possible to control the type of copolymer. For example, with lower ratios of $CS_2$ within the range indicated above the more alternating is the resultant copolymer structure, such as a repeating unit of diene, then one of olefin, then one of diene, then one of olefin, etc. With higher ratios of $CS_2$ within the indicated range, there is more block copolymer formed with the diene polymerizing first and then the olefin. In the intermediate area of this range there may be considerable random copolymer formed.

If desired, a portion of the $CS_2$, that is up to 50 mole percent, may be replaced by thiocarbonyl or thiocarbamyl or carbonyls such as thioacetophenone, benzothiophenone, acetylthioacetone, thioamides and dithiocarbamates, acetophenone, benzophenone, acetyl acetone, etc., without sacrificing the advantageous effects of the $CS_2$.

The titanium or vanadium halides that may be used as one of the catalyst components include $TiCl_4$, $VCl_5$, $TiBr_4$, $VBr_5$, $TiBrCl_3$, $TiBr_2Cl_2$, $TiBr_3Cl$, $VBrCl_4$, $VBr_2Cl_3$, $VBr_3Cl_2$, and $VBr_4Cl$, and mixtures thereof. Preferably $TiCl_4$ or $VCl_5$ is used.

The catalyst is used in a proportion of 1 to 10 millimoles per 100 grams of monomer. In referring to millimoles of catalyst, this corresponds to the millimoles of the titanium or vanadium compound since the catalyst is regarded or at least calculated as a complex of the titanium or vanadium compound with the other catalyst components.

Polymerization is advantageously conducted at a temperature of $-10°$ to $70°C$. ($14°–158°F$.), preferably $0°$ to $50°C$. ($32°–122°F$.). At these temperatures polymers are produced with yields as high as 98–99% and molecular weights generally no higher than 500,000, advantageously in the range of about 100,00 to 500,000, which correspond to dilute solution viscosities of 0.5 to 3, preferably 250,000–500,000 (DSV of 1.5 to 3). Also at these temperatures, the polymerization rate is quite fast and very practical use is made of this catalyst. This is in contrast to prior art processes which teach temperatures of $-40°$ to $0°$ C. to obtain practical molecular weights and yields.

The polymerization is advantageously effected in the presence of an inert diluent to facilitate handling of the polymer and to give better temperature control. Normally liquid hydrocarbons are preferred for this purpose, such as benzene, toluene, aliphatic hydrocarbons such as n-hexane, n-heptane, cyclohexane, etc. or propane, butane, propylene, ethylene, ethane, etc. with the use of higher pressures. However, while the copolymerization may be conducted in any of the above diluents, the catalyst system is advantageously prepared in a diluent containing at least 20% aromatic hydrocarbon, such as benzene, toluene, xylene, ethyl benzene, etc. The aromatic hydrocarbons appear to stablize the catalyst complex. Nevertheless, once the catalyst complex is prepared and stabilized, the copolymerization may be conducted in aromatic, aliphatic or cycloaliphatic hydrocarbon diluents or mixtures thereof.

The polymerization is advantageously conducted in a pressure vessel to avoid loss of monomer and solvent, particularly if temperatures are to be used at or above the boiling point of either.

Conjugated dienes that may be copolymerized in accordance with this invention include: 1,3-butadiene, isoprene, chloroprene, 2-phenyl-1,3-butadiene, piperylene, etc.

The alpha-olefins that may be copolymerized with the conjugated diene include ethylene, propylene, n-butene-1, isobutylene, n-pentene-1, and other alpha-olefins having up to 10 carbon atoms.

In the comonomer mixture, the propylene or other olefin is used in an amount representing 5–90%, preferably 10–60%, by weight of the total monomers. In the resultant copolymer, the proportion of olefin depends somewhat on the degree of conversion but in most cases is in the range of 5–90 percent, preferably 10–60 percent olefin.

The rubbery copolymers of 1,3-butadiene and olefin produced by the present invention have processing properties and practical physical properties superior to those of rubber products obtained from natural rubber. They can be used for articles such as tire carcases, tire treads, belting, industrial articles, sponge products and car accessories.

For the production of rubber products the copolymers may be mixed with other rubbery materials such as natural rubber, butadiene-styrene rubber, polybutadiene rubber, polyisoprene rubber, chloroprene rubber, butadieneacrylonitrile rubber, butadiene-methacrylate rubber and ethylene-propylene rubber in any desired proportion. It is effective for improving the processing properties and practical properties of such rubbery materials. Generally, such a rubber composition should contain at least 20% by weight of the copolymer of the present invention. Below 20%, there is little improvement in the processing properties and the physical properties of the cured rubber products.

The "dilute solution viscosity" referred to herein is defined as the inherent viscosity determined at 25° C. on a 0.4% solution of the polymer in toluene. It is calculated by dividing the natural logarithm of the relative viscosity by the percent concentration of the solution, i.e., it is the inherent viscosity measured at 0.4% concentration. The molecular weights reported herein are determined from these viscosities and are the number average molecular weights.

SPECIFIC EMBODIMENTS OF THE INVENTION

The invention is illustrated by the following examples which are intended merely for purpose of illustration and are not to be regarded as limiting the scope of the invention or the manner in which it may be practiced. Unless specifically indicated otherwise, parts and percentages are given by weight.

EXAMPLE I

A clean one-gallon stainless steel reactor equipped with stirrer, inlet, outlet and temperature control means is dried and swept clean of air and moisture with a stream of nitrogen. To this reactor there is introduced under an atmosphere of nitrogen, a monomer blend which has been dried by passing it through a 3A molecular sieve column over an hour period. The monomer blend contains 4.12 lbs. of toluene and 0.88 lbs. of an isoprene-propylene mixture containing 0.72 lbs, (326 gms.) of isoprene and 0.16 lbs. (72 gms.) of propylene.

This represents 26.9 mole % propylene and 73.1 mole % isoprene in the monomer portion. The catalyst components are then added in the following order: 2.4 millimoles of $CS_2$; 31.78 mM of $TiCl_4$ and 36.54 mM of triisobutyl aluminum. The Al/Ti ratio is 1.15 and the $Ti/CS_2$ ratio is 13.3/1. This represents about 8 millimoles of catalyst per 100 gms. of monomer. With the temperature maintained at 30°–34°F., the mixture is stirred for 66 hours. Then the catalyst is deactivated and the copolymer precipitated by dropping the reaction product into a large volume of methanol containing one percent antioxidant. The polymer product is drum dried to give an 89.8% yield which indicates a substantial proportion of the propylene is copolymerized.

EXAMPLE II

The procedure of Example I is repeated except that the temperature of polymerization is 25°–34°F, and the polymerization is conducted over a period of 48 hours with samples removed periodically for analysis. The autogenous pressure is 55 psi throughout the reaction. The results are tabulated below:

| Time (hrs.) | Temp. (°F) | Conversion % | Mol % Propylene | DSV | % Gel | Block Polymer |
|---|---|---|---|---|---|---|
| 1 | 25 | 9.2 | 15.0 | 2.94 | 2.26 | 6.36 |
| 3 | 28 | 21.6 | — | 3.66 | 0.0 | 5.60 |
| 4 | 30 | 27.1 | — | 3.96 | 0.0 | 3.78 |
| 6 | 32 | 41.3 | 10.1 | 4.28 | 0.0 | 6.51 |
| 22 | 34 | 69.3 | 13.2 | 3.27 | 2.71 | — |
| 24 | 34 | 77.2 | 10.8 | 2.56 | 18.49 | — |
| 30 | 34 | 84.4 | 10.8 | 3.96 | 0.0 | 26.8 |
| 48 | 34 | 84.9 | 16.2 | 2.81 | 4.48 | 22.5 |

The final product has a glass transition temperature (Tg) of −64°C., and the IR analysis shows 93.4% cis, 4.6% trans, 0.1% 1,2 and 1.9% 3,4. The high mole percent of propylene, in comparison with the 18% starting monomer, shows a high copolymerization rate of the propylene. The particular type of gel obtained is helpful as a processing aid and is not objectionable in end use of the polymer.

EXAMPLE III

The procedure of Example II is repeated at a temperature of 42°–62°C using a monomer blend containing 20% of a mixture of 70% propylene and 30% isoprene (79 mole % propylene and 21 mole % isoprene). The results are tabulated below. The type of gel obtained is helpful as a processing aid.

| Time (hrs.) | Temp. (°F.) | Conversion % | Mol.% Prop. | DSV | % Gel | Block Polymer |
|---|---|---|---|---|---|---|
| 1 | 54 | — | 51.9 | 1.28 | 6.31 | 20.2 |
| 2 | 62 | 38.9 | 50.0 | 1.20 | 10.74 | 21.5 |
| 4 | 42 | 40.7 | 50.7 | 1.14 | 7.93 | 22.48 |
| 6 | 42 | 42.6 | 48.2 | 1.12 | 9.70 | 22.6 |
| 24 | 50 | 52.1 | 50.0 | 1.09 | 10.45 | 25.08 |
| 28 | 45 | 46.6 | 68.8 | 0.97 | 14.29 | 26.84 |
| 30 | 45 | 53.0 | 57.8 | 1.0 | 6.42 | 26.23 |
| 48 | 45 | 50.8 | 73.1 | 0.95 | 8.18 | 26.77 |

EXAMPLE IV

| Temp. °F. | Time Hrs. | $CS_2$ mMoles | $TiCl_4$ mMoles | (Isobut.)$_3$Al mMoles | Al/Ti Ratio | % Conversion |
|---|---|---|---|---|---|---|
| 40 | 16 | 0.3 | 4.0 | 4.6 | 1.15 | 39 |
| 40 | 16 | 0.3 | 4.0 | 5.0 | 1.25 | 55.9 |
| 40 | 16 | 0.3 | 4.0 | 5.4 | 1.35 | 59.3 |
| 120 | 16 | 0.3 | 4.0 | 4.6 | 1.15 | 64.4 |
| 120 | 16 | 0.3 | 4.0 | 5.0 | 1.25 | 73.7 |
| 120 | 16 | 0.3 | 4.0 | 5.4 | 1.35 | 78 |

EXAMPLE V

The procedure of Example IV is repeated a number of times using variations in $CS_2$ and in the Al/Ti ratio together with a temperature of 30°C. (86°F.) and a reaction period of 16 hours in each case. The variations and results are:

| $CS_2$ m Moles | $TiCl_4$ m Moles | (Isobut.)$_3$Al m Moles | Al/Ti | Conversion |
|---|---|---|---|---|
| 0.1 | 4.0 | 5.0 | 1.25 | 57 |
| 0.3 | 4.0 | 5.0 | 1.25 | 61.8 |
| 0.5 | 4.0 | 5.0 | 1.25 | 63.5 |
| 0.7 | 4.0 | 5.0 | 1.25 | 59.3 |
| 0.1 | 4.0 | 5.4 | 1.35 | 69.5 |
| 0.3 | 4.0 | 5.4 | 1.35 | 76.2 |
| 0.5 | 4.0 | 5.4 | 1.35 | 71.2 |
| 0.7 | 4.0 | 5.4 | 1.35 | 72.9 |

EXAMPLE VI

The procedure of Example I is repeated using a 5 pound blend containing 26% monomer having 50 mole % of propylene and 50 mole % of isoprene; a catalyst charge of 3 mM $CS_2$, 40 mM $TiCl_4$ and 46 mM triisobutyl Al; and a temperature of 82°F. (27.8°C) for a reaction period 68 hours. The polymer product represents a 61.4% conversion and has the following properties:

| | |
|---|---|
| Mole percent propylene | 32.8 |
| Mole percent isoprene | 67.2 |
| Tg | −69 and 20°C |
| DSV | 1.69 |
| % Gel | 11.76 |

EXAMPLE VII

The procedure of Example IV is repeated using the same variety of Al/Ti ratios but at 70°C.(158°F.). The high molecular weight products represent the conversions reported in the table below together with the mole percents of monomer:

| Al/Ti Ratio | % Conv. | Propylene Mole % | Isoprene Mole % |
|---|---|---|---|
| 1.15 | 55.1 | 45.5 | 54.5 |
| 1.25 | 59.3 | 44.0 | 56.0 |
| 1.35 | 61.0 | 46.7 | 53.3 |

EXAMPLE VIII

The procedure of Example VII is repeated in a larger reactor using a 10 lb. charge with the same catalyst proportions as used for the Al/Ti ratio of 1.35 but for a reaction period of 42 hours and a temperature of 70°–120°C.(158°–248°F.). A 73.8% conversion to a high molecular weight product is obtained with 52.5 mole percent of propylene and 47.5 mole percent of isoprene.

EXAMPLE IX

The procedure of Example VIII is repeated using a 5 lb. charge with proportionate amounts of catalyst with the blend containing 25.6% monomer comprising 50 mole % of propylene and 50 % of isoprene. The reaction period is 90 hours and the temperature is initially at 40°F and finally down to 25°F. The results are:

| | |
|---|---|
| % Conversion: | 72 |
| Propylene mole % | 35.6 |
| Isoprene mole % | 64.4 |
| DSV | 1.96 |
| % Gel | 0.38 |
| Tg (°C) | .64 |

EXAMPLE X

The procedure of Example I is repeated a number of times using each time 0.6 lb. of a blend of toluene, 1,3-butadiene and isobutylene containing 30 mole percent of isobutylene and 70 mole percent of butadiene in the monomer portion. The amount of triisobutyl aluminum is varied and a temperature of 50°C is used together with a polymerization period of 65 hours. The proportions and percent conversions are:

| $CS_2$ m Moles | Ti $Cl_4$ m Moles | $(C_4H_9)_3$ Al m Moles | Al/Ti Ratio | % Conversion |
|---|---|---|---|---|
| 0.3 | 4.0 | 4.0 | 1.0 | 60 |
| 0.3 | 4.0 | 4.4 | 1.1 | 48.9 |
| 0.3 | 4.0 | 4.6 | 1.15 | 37.8 |
| 0.3 | 4.0 | 6.0 | 1.5 | 11.1 |

EXAMPLE XI

The procedure of Example I is repeated a number of times using each time 0.6 lb. of a blend of toluene, 1,3-butadiene and isobutylene containing 30 mole percent of isobutylene and 70 mole percent of butadiene in the monomer portion. In this series of runs the amount of $CS_2$ and of triisobutyl aluminum are varied. In each case the standard conditions are

| | |
|---|---|
| Ti $Cl_4$ (millimoles) | 40 |
| Catalyst preparation temp. (°C.) | 30 |
| Polymerization temp. (°C.) | 30 |
| Reaction time (Hrs.) | 19 |

The results are tabulated below.

| CS$_2$ m Moles | (C$_4$H$_9$)$_3$Al m Moles | Al/Ti Ratio | Butadiene - Isobutylene Copolymerization | | | | | | | |
|---|---|---|---|---|---|---|---|---|---|---|
| | | | % Conversion | Mole % Isob. | Cis-1,4(%) | Trans-1,4(%) | 1,2(%) | DSV | % Gel | Tg (°C) |
| 0.0 | 4.4 | 1.10 | 0.2 | 0.0 | — | — | — | — | — | — |
| 1.0 | 4.4 | 1.10 | 20.0 | 37.3 | 64.8 | 32.6 | 2.6 | 1.99 | 12.04 | −102; −71 |
| 0.8 | 4.4 | 1.10 | 16.3 | 33.3 | 71.9 | 25.5 | 2.6 | 1.66 | 19.78 | −103; −71 |
| 0.5 | 4.4 | 1.10 | 30.6 | 22.9 | 71.5 | 25.7 | 2.9 | 1.53 | 53.49 | −104 |
| 0.0 | 5.4 | 1.35 | 10.2* | 2.5 | — | — | — | — | — | — |
| 1.0 | 5.4 | 1.35 | 10.2 | 23.4 | 72.8 | 23.8 | 4.3 | 1.15 | 44.48 | −104 |
| 0.8 | 5.4 | 1.35 | 18.3 | 27.4 | 76.9 | 17.8 | 5.4 | 0.76 | 76.53 | — |
| 0.5 | 5.4 | 1.35 | 24.4 | 27.4 | 63.8 | 22.6 | 13.7 | 0.73 | 69.91 | — |

*Butadiene homopolymer

EXAMPLE XII

The procedures of Examples I and III are repeated a number of times with similar results using in place of the propylene and isoprene equivalent amounts respectively of:
a. Isobutylene and piperylene
b. Propylene and Butadiene
c. Isobutylene and isoprene
d. m-butene-1 and butadiene
e. m-Hexene-1 and isoprene

EXAMPLE XIII

The procedures of Examples I and III are repeated a number of times with similar results using in place of the triisobutyl aluminum equivalent amounts respectively of:
a. Triethyl aluminum
b. Tripropyl aluminum
c. Trihexyl aluminum
d. Triphenyl aluminum
e. Tricyclohexyl aluminum
f. Tribenzyl aluminum

EXAMPLE XIV

The procedures of Examples I and III are repeated with similar results using in place of the Ti Cl$_4$ equivalent amounts respectively of:
a. V Cl$_5$
b. Ti BrCl$_3$
c. V Br$_2$Cl$_3$
d. Ti Br$_4$
e. V Br$_5$ While certain features of this invention have been described in detail with respect to various embodiments thereof, it will, of course, be apparent that other modifications can be made within the spirit and scope of this invention, and it is not intended to limit the invention to the exact details shown above except insofar as they are defined in the following claims:

The invention claimed is:

1. A process for the hydrocarbon solution polymerization of a monomer composition consisting essentially of 10–95 percent by weight of a conjugated diene and 5–90 percent by weight of an alpha olefin having 2–8 carbon atoms to produce a copolymer having 5–90 percent of the alpha olefin in the resultant copolymer comprising the steps of maintaining said monomer composition at a temperature of −10° to 70°C. in intimate contact with a catalyst composition consisting essentially of:

a. A metal halide compound having the formula TiBr$_n$Cl$_{4-n}$ or VBr$_m$Cl$_{5-m}$ wherein $n$ has a value of 0–4 and $m$ has a value of 0–5;
b. An aluminum hydrocarbon compound having the formula AlR$_3$ wherein R is a hydrocarbon group having 1–8 carbon atoms selected from the class consisting of alkyl, aryl and cycloalkyl group; and
c. CS$_2$;

the proportion of said metal halide compound being 1–10 millimoles per 100 grams of said monomer composition; the proportion of said aluminum compound being 0.9–3 moles per mole of metal halide compound; and the proportion of said CS$_2$ being 0.01–0.5 mole per mole of said metal halid compound, said polymerization being conducted for a period of at least one hour.

2. The process of claim 1 in which said diene is butadiene.

3. The process of claim 1 in which said diene is isoprene.

4. The process of claim 2 in which said alpha-olefin is propylene.

5. The process of claim 1 in which said alpha-olefin is isobutylene.

6. The process of claim 1 in which said metal halide is titanium tetrachloride.

7. The process of claim 6 in which said aluminum compound is a trialkyl aluminum.

8. The process of claim 6 in which said aluminum compound is triisobutyl aluminum.

9. The process of claim 6 in which said aluminum compound is triethyl aluminum.

10. The process of claim 6 in which said aluminum compound is tripropyl aluminum.

11. The process of claim 7 in which said temperature is 0°–50°C.

12. The process of claim 8 in which said monomer composition is 10–50 percent by weight propylene.

13. The process of claim 9 in which said titanium tetrachloride is used in a proportion of 1–10 millimoles per 100 grams of monomer.

14. The process of claim 13 in which said proportion is about 8 millimoles per 100 grams of monomer.

15. The process of claim 7 in which the Al/Ti molar ratio is in the range of 0.9/1 to 1.15/1.

16. The process of claim 1 in which said hydrocarbon solution contains 10–90 percent by weight of said monomers.

17. The process of claim 1 in which said hydrocarbon solution contains 10–50 percent by weight of said monomers.

18. The process of claim 1 in which said hydrocarbon is an aromatic hydrocarbon.

19. The process of claim 17 is which said hydrocarbon is toluene.

* * * * *

UNITED STATES PATENT OFFICE
CERTIFICATE OF CORRECTION

Patent No. 3,948,869           Dated   April 6, 1976

Inventor(s)   Adel Farhan Halasa and Richard Gutierrez

It is certified that error appears in the above-identified patent and that said Letters Patent are hereby corrected as shown below:

In Column 6, Line 34 (Example IX), ".64" should read -- -64 --.

In Column 8, Line 27 (Claim 1), "halid" should read -- halide --.

Signed and Sealed this

Sixth Day of July 1976

[SEAL]

Attest:

RUTH C. MASON
Attesting Officer

C. MARSHALL DANN
Commissioner of Patents and Trademarks